(No Model.)

J. P. STEEDMAN, T. PARTRIDGE & A. TURNBULL.
PLATFORM SCALES.

No. 413,572. Patented Oct. 22, 1889.

Witnesses
A. E. Jones.
Fred Battle

Inventors
J. P. Steedman
Thos. Partridge
Andrew Turnbull
By W. Bruce
atty

UNITED STATES PATENT OFFICE.

JAMES P. STEEDMAN AND THOMAS PARTRIDGE, OF HAMILTON, ONTARIO, CANADA, AND ANDREW TURNBULL, OF NEW BRITAIN, CONNECTICUT, ASSIGNORS TO THE E. & C. GURNEY COMPANY, (LIMITED,) OF ONTARIO, CANADA.

PLATFORM-SCALES.

SPECIFICATION forming part of Letters Patent No. 413,572, dated October 22, 1889.

Application filed April 19, 1888. Serial No. 271,188. (No model.) Patented in Canada April 25, 1888, No. 29,007.

*To all whom it may concern:*

Be it known that we, JAMES PRINGLE STEEDMAN and THOMAS PARTRIDGE, both of the city of Hamilton, in the county of Wentworth, Province of Ontario, Dominion of Canada, and ANDREW TURNBULL, of New Britain, Connecticut, United States of America, have jointly invented certain new and useful Improvements in Platform-Scales, (for which Letters Patent in Canada, No. 29,007, April 25, 1888, have been granted us;) and we do hereby declare that the following is a full, clear, and exact description of the construction and operation of the same.

The invention relates to a very handy and convenient device attached to ordinary platform-scales which will give much greater platform-surface for weighing grain, and particularly for weighing live stock of all kinds.

The device consists in a platform resting on a frame, the former provided with sockets—one at each corner—to receive four posts, to which side rails are secured and properly braced. Attached to the said platform by dovetail or other convenient devices is a movable extension at each end securely braced and strengthened, and which makes the platform large and strong enough to conveniently weigh cattle and horses.

Figure 1:
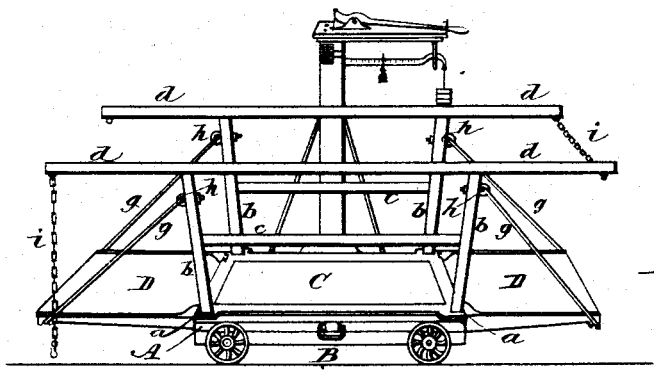
Figure 2:
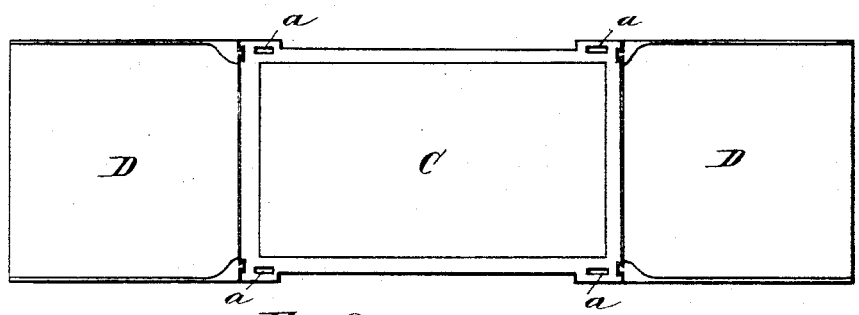
Figure 3:
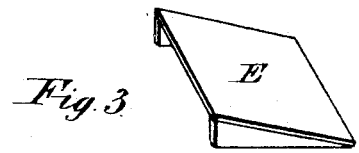

By reference to the drawings forming part of this specification it will be seen that Figure 1 represents a perspective view of the invention. Fig. 2 is a plan of platform. Fig. 3 is a perspective view of incline approach to scales for convenience in animals getting on the scales.

A represents an iron base-frame, and B the wood portion under it; C, the platform, properly balanced and adjusted and provided with a recess or socket at each corner, as at *a a a a*.

*b b b b* are the four posts set into the said sockets *a*, and may stand perpendicular, or slant outward slightly, as shown, to give more room at the top, where it is wanted in weighing cattle.

*c c* are side pieces connecting each pair of posts.

*d d* are top rails fastened in any convenient manner to the top of each pair of posts, as shown.

D D are the end extensions, which may be constructed of wood with metal sides and attached in any ordinary convenient manner to the platform C, preferably as shown, by dovetail projections *e*, formed on the metal frame of the extension and made to slide in corresponding recesses *f*, formed in the said platform C. This causes the extensions to be rigidly attached to the platform with their top surfaces exactly on a level.

*g g g g* are iron rod braces secured by eyebolts *h* to the outer posts *b b* and to the outer ends of the said extensions to cause them to stand the strain of heavy weights upon them.

*i i* are chains, which are made to extend across the ends of the rails *d d*, respectively, to keep cattle on the platform while being weighed. One end of each chain will be made fast to one of the rails *d*, and the other end loose and provided with a chain-hook to enter a link attached to the opposite rail *d*. The chains are only used when animals are being weighed.

E, Fig. 3, represents one of two end incline approaches which are placed at each end of the extensions D D as a means of conveniently allowing cattle to walk up onto the scales.

Hooks may be attached to the side rails to which to secure bags in position for filling them.

It may be observed that the particular advantages of our new scales are that a large platform can be combined with a comparatively small scales, and while grain in bags, &c., in large quantities can be easily and quickly weighed, it is particularly adapted for weighing live stock from the smallest to the largest size. When the movable extensions, posts, and rails are removed, the scales may be used as an ordinary platform-scales.

Having thus described our device and its advantages, what we claim as new, and desire to secure by Letters Patent, is—

1. In platform-scales, the combination of the platform C, extensions D D, upright posts $b\ b$, and rails $d\ d$, substantially as and for the purpose specified.

2. In platform-scales, the combination of the platform C, extensions D D, upright posts $b$, rails $d$, braces $c$, brace-rods $g$, and chains $i$, substantially as and for the purpose specified.

Dated at Hamilton, Ontario, this 19th day of March, A. D. 1888.

JAS. P. STEEDMAN.
   THOMAS PARTRIDGE.
   ANDREW TURNBULL.

In presence of—
 FRED BARTLE,
 WM. BRUCE.